(12) United States Patent
Li et al.

(10) Patent No.: US 7,965,944 B2
(45) Date of Patent: Jun. 21, 2011

(54) SYSTEM FOR PASSIVE SCRAMBLING AND UNSCRAMBLING OF AN OPTICAL SIGNAL

(75) Inventors: Shenping Li, Painted Post, NY (US); Dmitri Vladislavovich Kuksenkov, Painted Post, NY (US); Daniel Aloysius Nolan, Corning, NY (US)

(73) Assignee: Corning Incorporated, Corning, NY (US)

( * ) Notice: Subject to any disclaimer, the term of this patent is extended or adjusted under 35 U.S.C. 154(b) by 1068 days.

(21) Appl. No.: 11/804,387

(22) Filed: May 18, 2007

(65) Prior Publication Data

US 2008/0285753 A1 Nov. 20, 2008

(51) Int. Cl.
*H04B 10/13* (2006.01)
(52) U.S. Cl. ........................ 398/143; 398/168
(58) Field of Classification Search .................. 398/143, 398/168
See application file for complete search history.

(56) References Cited

U.S. PATENT DOCUMENTS

| | | | | |
|---|---|---|---|---|
| 4,866,699 | A * | 9/1989 | Brackett et al. ................. | 398/78 |
| 5,311,592 | A | 5/1994 | Udd .................... | 380/9 |
| 5,422,772 | A | 6/1995 | Udd et al. ...................... | 359/119 |
| 5,793,871 | A * | 8/1998 | Jackson .......................... | 380/54 |
| 6,104,517 | A | 8/2000 | Blodgett et al. ............... | 359/183 |
| 6,594,055 | B2 | 7/2003 | Snawerdt ....................... | 359/173 |
| 6,801,700 | B2 | 10/2004 | MacChesney et al. ........ | 385/127 |
| 2002/0172483 | A1 | 11/2002 | MacChesney et al. ........ | 385/124 |
| 2003/0002670 | A1 | 1/2003 | Wang .............................. | 380/52 |
| 2004/0071382 | A1 | 4/2004 | Rich et al. ........................ | 385/12 |
| 2007/0081825 | A1 | 4/2007 | Rossetti et al. ................ | 398/141 |
| 2007/0274732 | A1 * | 11/2007 | D'Errico et al. ............... | 398/202 |
| 2008/0240734 | A1 * | 10/2008 | Fuse .............................. | 398/200 |

FOREIGN PATENT DOCUMENTS

| | | |
|---|---|---|
| EP | 1591808 A1 | 11/2005 |
| EP | 1772983 A1 | 4/2007 |
| WO | WO2005/034391 | 4/2005 |
| WO | WO2006/019369 | 2/2006 |

OTHER PUBLICATIONS

"Multimode Concatenation Modal Group Analysis"; Journal of Lightwave Technology; vol. Lt-5; No. 12, Dec. 1987, p. 1727-1732.

(Continued)

*Primary Examiner* — Nathan M Curs
(74) *Attorney, Agent, or Firm* — Svetlana Z. Short (57) ABSTRACT

A system for passively scrambling and unscrambling a, pulse optical signal transmitted through a multi-mode optical fiber is provided. The system includes a scrambling unit connected between a signal receiving end of said transmission fiber and an optical signal source that includes an optical fiber which creates a differential delay between two groups of optical modes of the signal that is at least one bit period long such that said optical signal is passively scrambled, and an unscrambling unit connected to a signal transmitting end of said transmission fiber having an optical fiber that counteracts said differential delay between said two groups of optical modes of the signal such that said optical signal is passively unscrambled. The scrambling unit optical fiber has an alpha profile with a complementary perturbation that creates the differential delay between two groups of optical modes of the signal, and the unscrambling unit optical fiber has an alpha profile with reversal complementary perturbation that counteracts the differential delay between said two groups of optical modes of the signal. Alternatively, the scrambling and unscrambling units may have the combination of a mode splitter that splits the signal into two different groups of optical modes, and a pair of optical fibers that conduct the two groups of optical modes in parallel, the fibers being of different lengths to create or to counteract a differential delay in the two groups of modes.

20 Claims, 8 Drawing Sheets

OTHER PUBLICATIONS

Fundamentals of Optical Fiber Communications; Second Edition; edited by Michael K. Barnoski; Copyright 1981 by Academic Press, Inc.; p. 70.

Optical Waveguide Concepts; Charles Vassallo; Optical Wave Sciences and Technology; 1991 Elsevier Science Publishers B.V.; pp. 30-32.

XP031256828; "Passive Scrambling and Unscrambling for Secure Fiber Optic Communications"; Shenping Li et al; Optical Society of America (2007).

XP002090721; "Compensation of Intermodal Dispersion by Splicing Two Graded-Index Multimode Fibers"; Morishita et al; IEEE (1982); p. 694-700.

\* cited by examiner

SYSTEM FOR PASSIVE SCRAMBLING AND UNSCRAMBLING OF AN OPTICAL SIGNAL

FIELD OF THE INVENTION

This invention generally relates to a system for scrambling and unscrambling an optical signal for secure optical communications, and is specifically concerned with a passive system for scrambling and unscrambling pulsed optical signals in multi-mode fiber transmissions.

BACKGROUND OF THE INVENTION

Various techniques for preventing information theft from optical communication systems are known in the prior art. In one such technique, the structure of the transmitting optical fiber is modified either to block access to the core of the fiber to the "writing" radiation necessary to form a grating tap, or to provide additional optical paths that allow monitoring signals to be conducted through the fiber that are separate from the transmission signals conducted through the fiber core. A detected attenuation of the monitoring signals conducted through the fiber indicates a breach in the outer coating or cladding of the fiber. In another technique, a first active device (such as a phase modulator) encrypts the optical signals at a point of transmission, which are later decrypted at a point downstream in the optical network by a second active device.

While either prior art technique is capable of implementing secure optical transmissions, they are not without shortcomings. Techniques that require a modification of the structure of the transmission fiber are not easily applied to existing optical networks, as the existing optical transmission fiber must be replaced. Additionally, such modified fiber would be a relatively expensive "specialty" fiber requiring additional manufacturing steps or and/or modified materials over conventional fiber. Active encryption devices require relatively large amounts of space in the optical network, require an outside power source, and often cannot be easily installed by a simple splice into the transmission fiber. They are also relatively sensitive and failure-prone as compared to passive secure-transmission devices, such as the aforementioned modified fiber.

Clearly, what is needed is a passive device for providing secure optical transmissions that is easily installed on existing optical transmission systems without the need for replacing existing fiber. Ideally, such a device should take up only a small amount of space, provide only a minimum amount of signal attenuation, and should be capable of scrambling an optical signal using a virtually unlimited amount of different "keys" so that it is difficult, if not impossible for information thieves to extract the transmitted information from the scrambled signal.

SUMMARY OF THE INVENTION

Generally speaking, the invention is a system for passively scrambling and unscrambling a pulsed optical signal transmitted through a multi-mode optical fiber that overcomes the aforementioned shortcomings associated with the prior art. To this end, the system includes a scrambling unit connected to the signal transmitting end of the transmission fiber that includes an optical fiber which creates a differential delay between two groups of optical modes that is at least one bit period long such that said optical signal is passively scrambled, and an unscrambling unit connected to a signal receiving end of said transmission fiber having an optical fiber that counteracts said differential delay between said two groups of optical modes such that said optical signal is passively unscrambled.

The scrambling unit optical fiber has an optical property that creates the differential delay between two groups of optical modes, and the unscrambling unit optical fiber has a complementary optical property that counteracts the differential delay between the two groups of optical modes. The mode-delaying property may be, for example, a positive perturbation described by a function f(r) incorporated into an alpha profile of a fiber. The function f(r) may be a Gaussian function perturbation, a sinusoidal function perturbation, a polynomial function perturbation, a parabolic function, a hyperbolic function, a super-Gaussian function, a rectangular function, or a triangular function. The perturbation can also be the combination of above perturbations, or any other single peak or multiple peak perturbations. The unscrambling unit optical fiber which has the mode-synchronizing property has a complementary negative perturbation function −f(r).

Alternatively, the scrambling and unscrambling units may have the combination of a mode splitter that splits the signal into two different groups of optical modes, and a pair of optical fibers that conduct the two groups of optical modes in parallel, the fibers being of different lengths to create or to counteract a differential delay in the two groups of modes. For example, the scrambling unit may include two different lengths L1 and L2 connected to a mode splitter at their input ends, and a mode combiner at their output ends. The two different lengths L1 and L2 of optical fiber conduct the two groups of optical modes within the signal in parallel. The different lengths L1 and L2 of these optical fibers create a differential delay between the two groups of optical modes, which are recombined into a scrambled signal by the mode combiner which is connected to the signal receiving end of the transmission fiber. The descrambling unit also includes a pair of different lengths of optical fiber L3 and L4 which are likewise connected at their input and output ends to a mode splitter and mode combiner, respectively. The mode splitter of the descrambling unit splits the signal into same two groups of optical modes as the mode splitter of the scrambling unit, and the lengths L3 and L4 are chosen such as to re-synchronize the two delayed parts of the signal. Preferably, the same type of fiber is used to form L1-L4, so that the descrambler may be easily constructed by simply rendering the L1=L3 and L2=L4.

Both embodiments of the invention advantageously provide a simple, inexpensive way to passively and reliably scramble and unscramble a pulsed optical signal. Additionally, due to the large number of perturbation functions that can be incorporated into the alpha profile of the fiber in the first embodiment, large number of different lengths of fiber, or large number of different splitters and combiners that can be used in the second embodiment, the number of encryption keys that can be used in this system is very large. In addition, the concept of the first embodiment in principle allows for concatenated implementations which leverage the commutative property of scrambler pairs. For example if we name unique scrambling units A, B, C, and matched unscrambling units A', B', and C', and identify the transmission fiber as ↔ then the scrambling units and unscrambling units can be implemented in the sequence AB↔B'A', BA↔A'B', A↔A'A↔B↔B', as well as the more esoteric CBA↔B'↔A'C', and similar implementations.

DETAILED DESCRIPTION OF THE PREFERRED EMBODIMENTS

Figure 1:
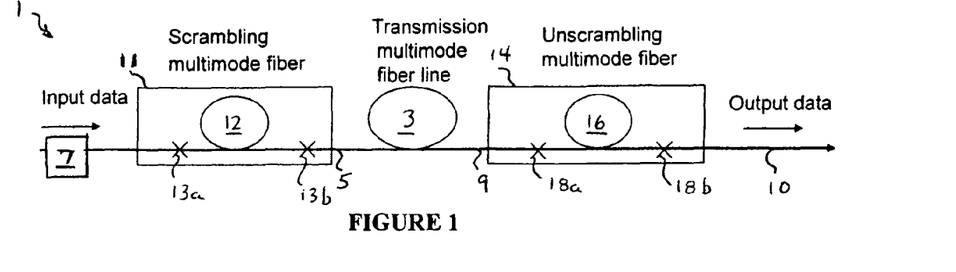
FIG. 1 is a schematic diagram of the scrambling and unscrambling system of the invention, wherein the scrambling and unscrambling units each include single lengths of optical fiber having complementary perturbations incorporated into their alpha profiles.

With reference to FIG. 1, the scrambling and unscrambling system 1 of the invention includes a transmission fiber formed from a length of multimode optical fiber 3 which may be part of an optical signal transmission network. Transmission fiber 3 has a receiving end 5 that receives optical signal pulses from a signal source 7, and a transmitting end 9 for relaying the signal pulses to an output fiber 10. A scrambling unit 11 is connected between the signal source 7 and the receiving end 5 of the transmission fiber 3. The scrambling unit 10 includes a length of scrambling multimode fiber 12 that may be between 1 and 500 meters long, but is more typically between 10 and 50 meters long. Fiber 12 is connected between the signal source 7 and receiving end 5 by way of optical fiber splices 13a, 13b or using fiber connectors. Similarly, an unscrambling unit 14 that includes an unscrambling multimode fiber 16 is connected between the transmitting end 9 of the transmission fiber 3 and the output fiber 10 via optical fiber splices 18a, 18b. The length of the unscrambling multimode fiber 16 is the same or substantially the same as the length of the scrambling fiber 12 for a reason that will become evident hereinafter.

In this embodiment of the system 1, the scrambling and unscrambling multimode fibers 12, 16 are designed with an intentionally added perturbation in the alpha refractive index profile of the fiber which, in the case of the scrambling fiber 12, creates a differential delay between two groups of optical modes, and in the case of the unscrambling fiber, counteracts this differential delay in order to re-synchronize the optical modes. In order to understand this concept, some definitions are in order.

The refractive index profile of an optical fiber is the relationship between the relative refractive index of the glass forming the fiber and waveguide fiber radius. The relative refractive index is in turn defined as $$\Delta = \frac{n_i^2 - n_c^2}{2n_i^2} \quad (1)$$

where $n_i$ is the refractive index of the core center, and $n_c$ is the average refractive index of the cladding region. Since the index of refraction of the core region $n_i$ must be greater than that of the surrounding cladding $n_c$ for the optical fiber to conduct light via total internal reflection, $\Delta$ must have a positive value.

The scrambling multimode fiber 12 is designed to have a second order alpha profile and a positive perturbation with a function of f(r). The positive perturbation profile $\Delta_p$ of the fiber 12 can be written as $$\Delta_p = \Delta_{opt}(r) + f(r) = 1 - \left(\frac{r}{a}\right)^2 + f(r). \quad (2)$$

To recover the optical signal, the unscrambling fiber 16 at the other side the transmission multimode fiber 3 is designed to have a second order alpha profile and a negative perturbation (−f(r)). The negative perturbation profile $\Delta_n$ of the unscrambling fiber 16 can be written as:

$$\Delta_n = \Delta_{opt}(r) - f(r) = 1 - \left(\frac{r}{a}\right)^2 - f(r) \quad (3)$$

Assuming a small refractive-index difference $\Delta n_0 = (n_i - n_c)$ between the core and cladding of the fiber 12 and 16 further assuming $n_c + \Delta n_0 \Delta_{opt}(r) \gg \Delta n_0 f(r)$, the normalized mode delay $T(r_t)$ created by the fiber 12 and 16 can be approximately written as $$T(r_t) = (n_i - n_c)\left(-f(r_t) + \frac{4}{r_t^2}\int_0^{r_t} f(r)rdr\right) \quad (4)$$

From Equation. (4), it can clearly be see that the mode delay produced by the scrambling fiber 12 with profile $\Delta_p$ can be perfectly compensated by using the unscrambling fiber 16 with the profile $\Delta_n$. Since the various functions can be used as fiber perturbation function f(r), theoretically, the number of keys of this approach is unlimited.

Figure 2A:
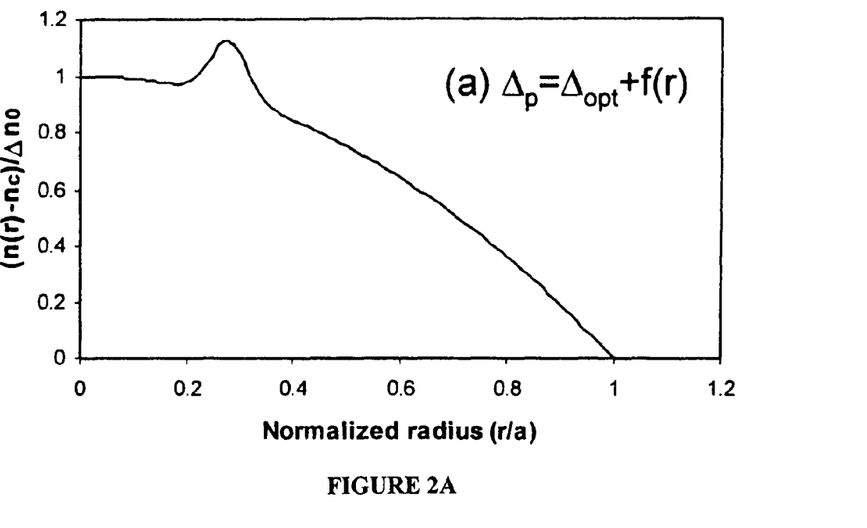
FIGS. 2A and 2B illustrate the alpha profiles of optical fibers used in the scrambling and unscrambling units, wherein the perturbations incorporated into the profiles follow complementary, single peak Gaussian functions centered at 0.3 of the normalized radius (r/a)
Figure 2B:
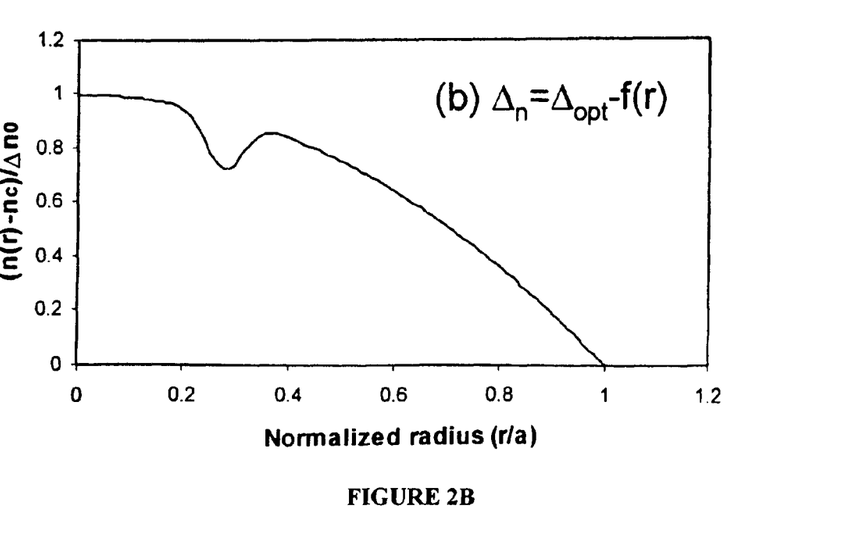

FIGS. 2A, 2B; 3A, 3B and 4A, 4B are refractive index profiles of scrambling and unscrambling fibers 12 and 16 wherein the vertical axis represents the normalized relative refractive index between the fiber core and the fiber cladding, and the horizontal axis represents the ratio between the radius of the fiber and the radius of the core. In all of these profiles, the maximum relative difference in index of refraction occurs at the center of the core of the fiber, and finally tapers to a zero difference where the radius of the fiber equals the radius of the fiber core. The primary difference between these profiles and the profile of a conventional optical fiber is the intentionally added perturbation occurring at 0.3, 0.5, and 0.7 along the horizontal (normalized radius) axis, which consists of a single peak Gaussian function which can be expressed as:

$$f(r) = A\exp\left\{\frac{[(r-r_0)/a]^2}{t_0^2}\right\}.$$

Figure 3A:
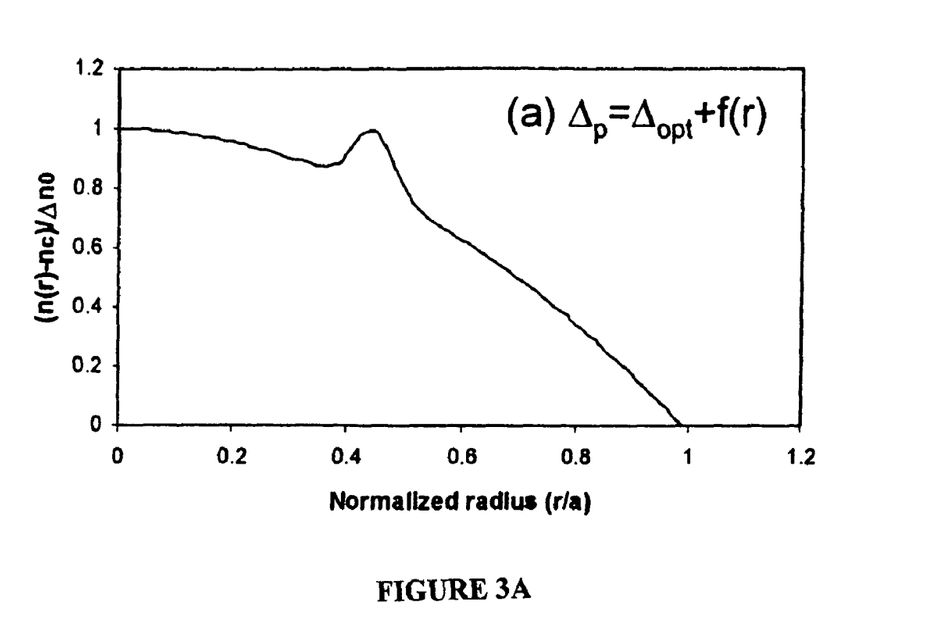
FIGS. 3A, 3B illustrate alpha profiles of optical fibers used in the scrambling and unscrambling units wherein the perturbations incorporated into the profiles follow complementary, single peak Gaussian functions centered at 0.5 of the normalized radius (r/a)
Figure 3B:
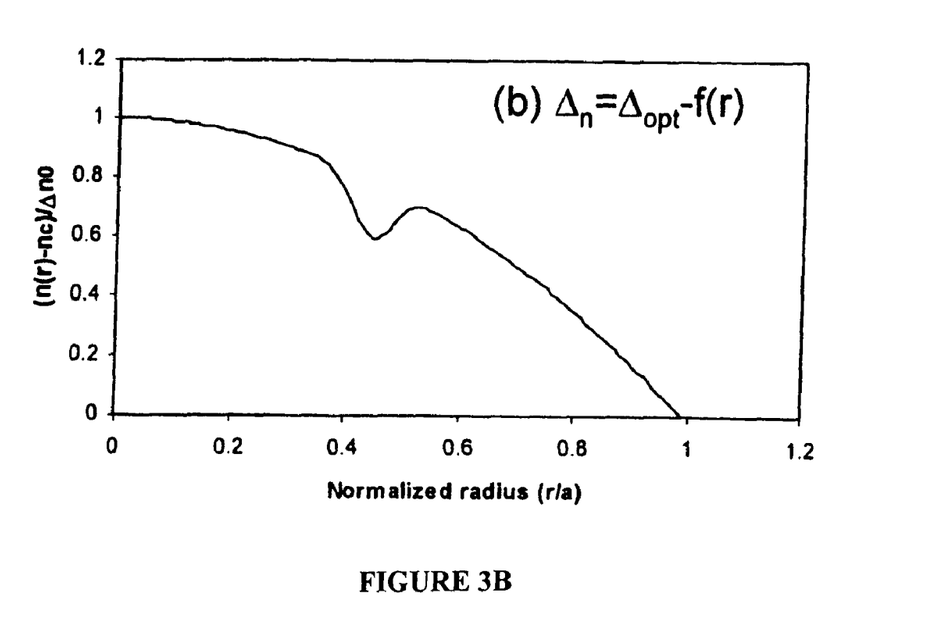
Figure 4A:
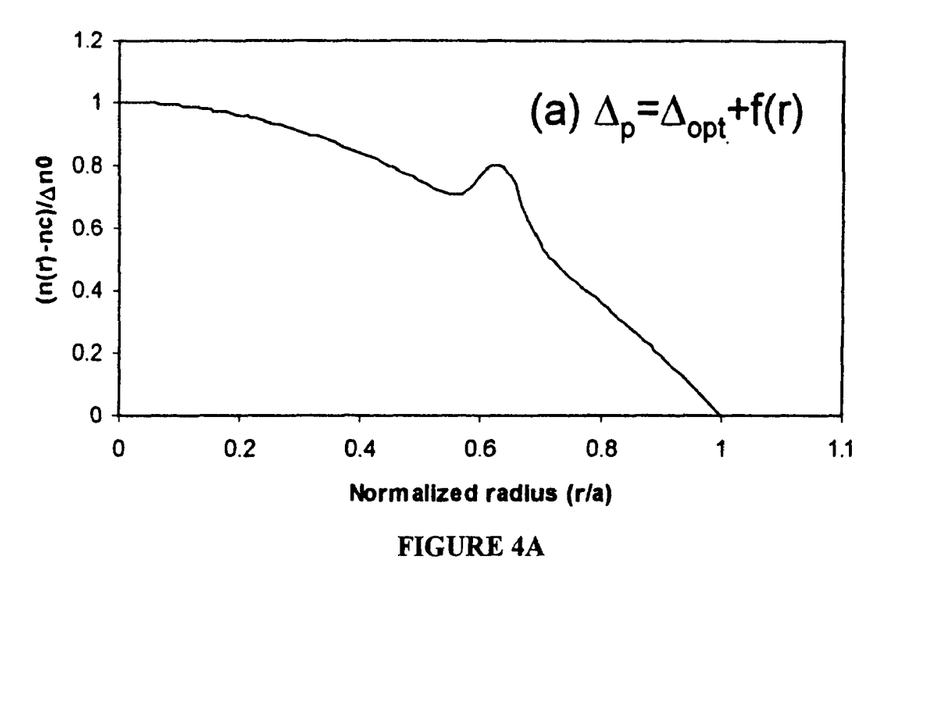
FIGS. 4A, 4B illustrate alpha profiles of optical fibers used in the scrambling and unscrambling units wherein the perturbations incorporated into the profiles follow complementary, single peak Gaussian functions centered at 0.7 of the normalized radius (r/a)
Figure 4B:
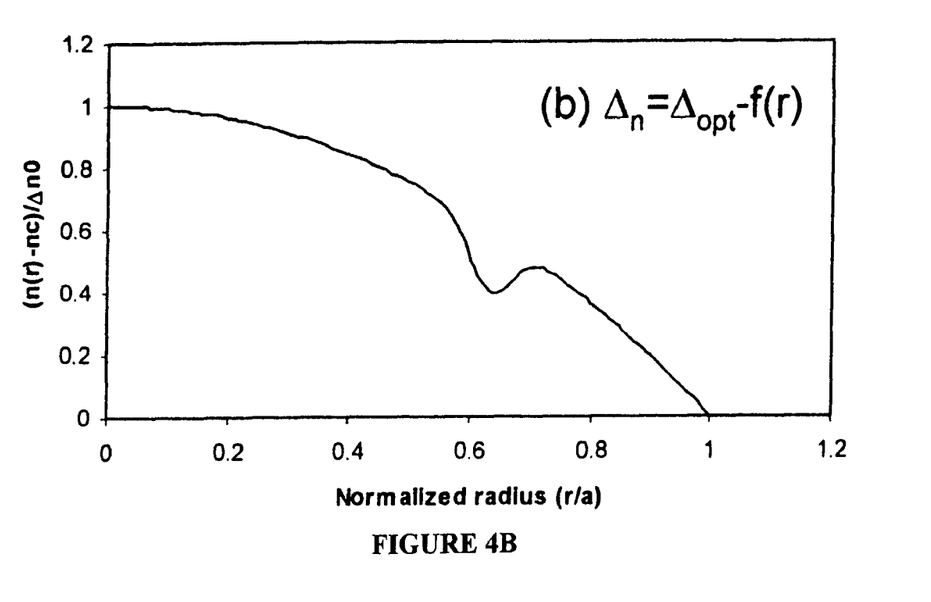

By changing the perturbation amplitude A ($0.1 < A \leq 1$), the perturbation position $r_0$, ($0 < r_0 \leq a$), and the perturbation pulse width $t_0$ ($0 < t_0 \leq 1$), we can get scrambling (or unscrambling) fibers with different keys. In first profile design shown in FIGS. 2A and 2B, the parameters are $r_0=0.3$, $A=0.2$, $t_0=0.05$, the difference between the two being that FIG. 2B is the negative of the function illustrated in FIG. 2A. In the second profile design shown in FIGS. 3A and 3B, the parameters are $r_0=0.5$, $A=0.2$, $t_0=0.05$. The parameters in the third design shown in FIGS. 4A and 4B are $r_0=0.7$, $A=0.2$, $t_0=0.05$. FIGS. 3B and 4B are, of course, the negatives of the functions shown in FIGS. 3A and 4A.

Figure 5:
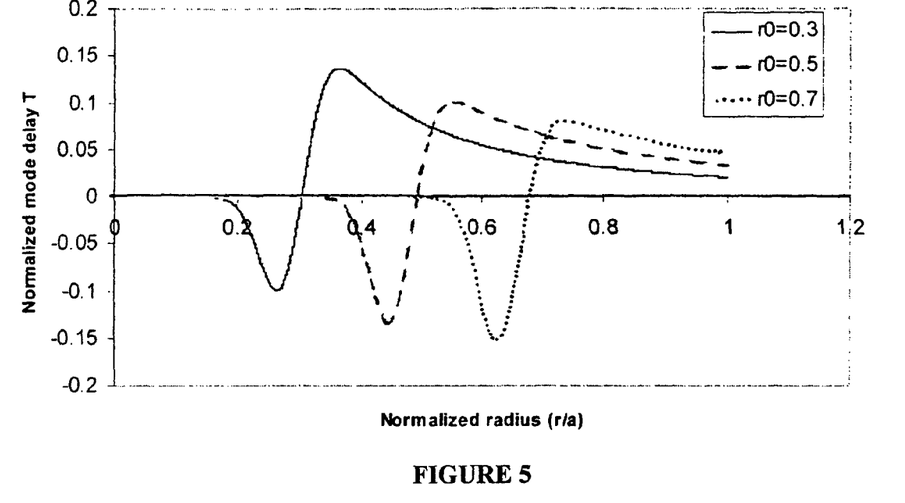
FIG. 5 illustrates the mode delay associated with perturbations in the fiber alpha profile following the aforementioned single peak Gaussian functions centered at 0.3, 0.5 and 0.7 of the normalized radius (r/a)

FIG. 5 is a graph illustrating the normalized mode delay for the three positive perturbation profiles ($\Delta_p$) illustrated in FIGS. 2A, 2B; 3A, 3B and 4A, 4B where $r_0=0.3$, 0.5, and 0.7 respectively. As shown in FIG. 5, the normalized mode delay changes with the shifting of the perturbation position $r_0$. Since the maximum and minimum positions of the mode delay move with the perturbation position, fibers with different perturbation positions have maximum positive and negative mode delays at different order modes. This relationship indicates that different keys can be achieved by changing the perturbation position. Table 1 gives maximum mode delay and number of achievable keys for ten fiber designs with single peak Gaussian functions profile perturbations:

TABLE 1

| Profile No. | $r_0 =$ | Max. mode delay per meter (ns/m) | Max. mode delay of 30 m (ns) | Number of keys (0.2 ns space) |
|---|---|---|---|---|
| 1 | 0.10 | 0.013866667 | 0.416 | 2.08 |
| 2 | 0.19 | 0.015533333 | 0.466 | 2.33 |
| 3 | 0.28 | 0.0158 | 0.474 | 2.37 |
| 4 | 0.37 | 0.015733333 | 0.472 | 2.36 |
| 5 | 0.46 | 0.015533333 | 0.466 | 2.33 |
| 6 | 0.54 | 0.015266667 | 0.458 | 2.29 |
| 7 | 0.63 | 0.015333333 | 0.46 | 2.3 |
| 8 | 0.72 | 0.015066667 | 0.452 | 2.26 |
| 9 | 0.81 | 0.014933333 | 0.448 | 2.24 |
| 10 | 0.90 | 0.011066667 | 0.332 | 1.66 |

In Table 1, the number of keys is calculated by considering a mode delay space of 0.2 ns, and maximum fiber length for scrambling or unscrambling is 30 m. It can be seen that two keys can be achieved for each fiber design. In all calculations of the number of keys in this invention, the fiber parameter $\Delta n_0 = (n_t - n_c) = 0.02$ is used.

Figure 6A:
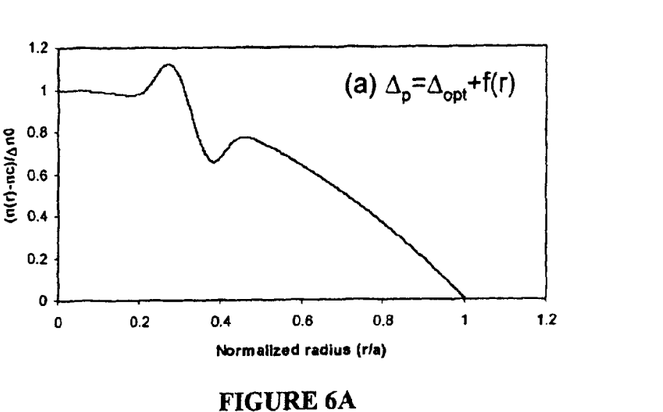
FIGS. 6A and 6B illustrate the alpha profiles of optical fibers used in the scrambling and unscrambling units wherein the perturbations incorporated into the profiles follow complementary, double peak Gaussian functions respectively centered at 0.3 and 0.4 of the normalized radius (r/a)
Figure 6B:
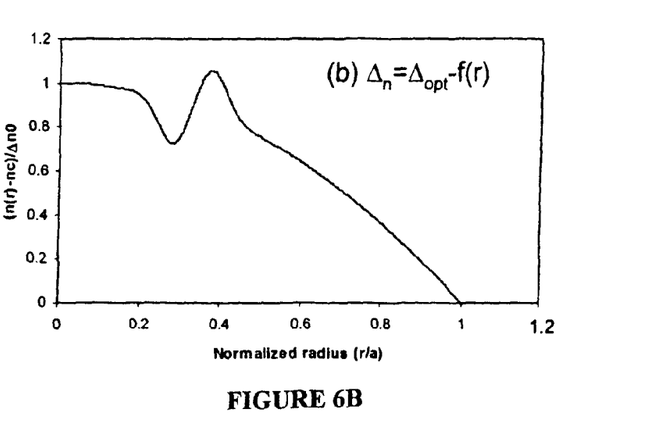

FIGS. 6A, 6B are refractive index profiles of multimode scrambling and unscrambling fibers 12 and 16 where the profile perturbation is a positive and negative double peak Gaussian function with centers occurring at 0.3 and 0.4 along the normalized radius axis, respectively. The double peak Gaussian function may be expressed as:

$$f(r) = A\exp\left\{\frac{[(r-r_0)/a]^2}{t_0^2}\right\} - A_1\exp\left\{\frac{[(r-r_0-r_{01})/a]^2}{t_{01}^2}\right\}. \quad (6)$$

By changing perturbation amplitudes A, and $A_1$ ($0.1 < A$, $A_1 < 1$), the perturbation positions $r_0$ ($0 < r_0 \leq a$) and $r_{01}$ ($r_{01} \neq r_0$, $0 < r_{01} \leq a$), and the perturbation pulsewidths $t_0$ and $t_{01}$ ($0 < t_0$, $t_{01} \leq 1$), scrambling and unscrambling fibers 12, 16 with different keys can be achieved. Table 2 gives maximum mode delay per meter and the number of achievable keys for ten fiber designs with double peak Gaussian function profile perturbations as follows:

TABLE 2

| Profile No. | r0 = | Max. mode delay per meter (ns/m) | Max. mode delay of 30 m (ns) | Number of keys (0.2 ns space) |
|---|---|---|---|---|
| 11 | 0.10 | 0.023 | 0.69 | 3.45 |
| 12 | 0.19 | 0.022 | 0.66 | 3.3 |
| 13 | 0.28 | 0.0238 | 0.714 | 3.57 |
| 14 | 0.37 | 0.024466667 | 0.734 | 3.67 |
| 15 | 0.46 | 0.024666667 | 0.74 | 3.7 |
| 16 | 0.54 | 0.025333333 | 0.76 | 3.8 |
| 17 | 0.63 | 0.025533333 | 0.766 | 3.83 |
| 18 | 0.72 | 0.025466667 | 0.764 | 3.82 |
| 19 | 0.81 | 0.0256 | 0.768 | 3.84 |

The parameters $A=A_1$, $t_0=t_{01}$ and $r_{01}$ are respectively 0.2, 0.05, and 0.1 for all fiber designs in Table 2. The number of keys is calculated by considering a mode delay space of 0.2 ns, and maximum fiber length for scrambling or unscrambling is 30 m. It can be seen that three keys can be achieved for each fiber design.

Figure 7:
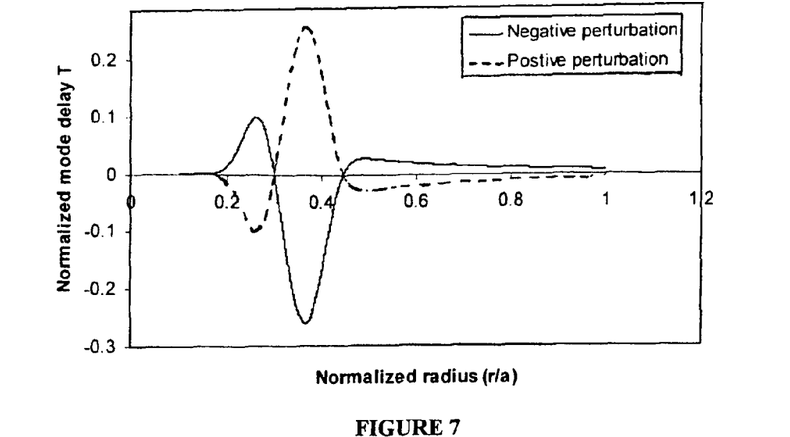
FIG. 7 illustrates the mode delay associated with perturbations in the fiber alpha profile following the aforementioned double peak Gaussian functions respectively centered at 0.3 and 0.4 of the normalized radius (r/a) for both the negative and positive perturbations.

FIG. 7 is a graph illustrating the corresponding normalized mode delay for both negative and positive perturbation profiles. It clearly shows that the mode delay produced by the scrambling fiber 12 having positive perturbation profile $\Delta_p$ along the normalized radius axis can perfectly compensated for by using an unscrambling fiber 16 with the complementary negative perturbation profile $\Delta_n$.

Figure 8A:
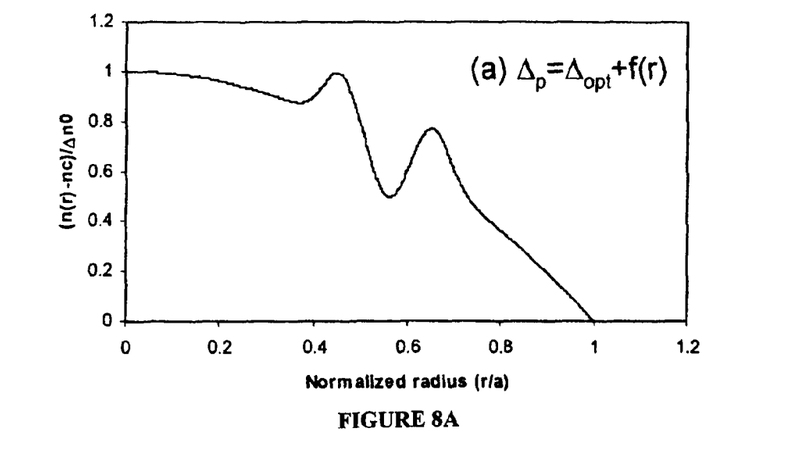
FIGS. 8A and 8B illustrate the alpha profiles of optical fibers used in the scrambling and unscrambling units wherein the perturbations incorporated into the profiles follow complementary, triple peak Gaussian functions respectively centered at 0.4, 0.5, 0.6 of the normalized radius (r/a)
Figure 8B:
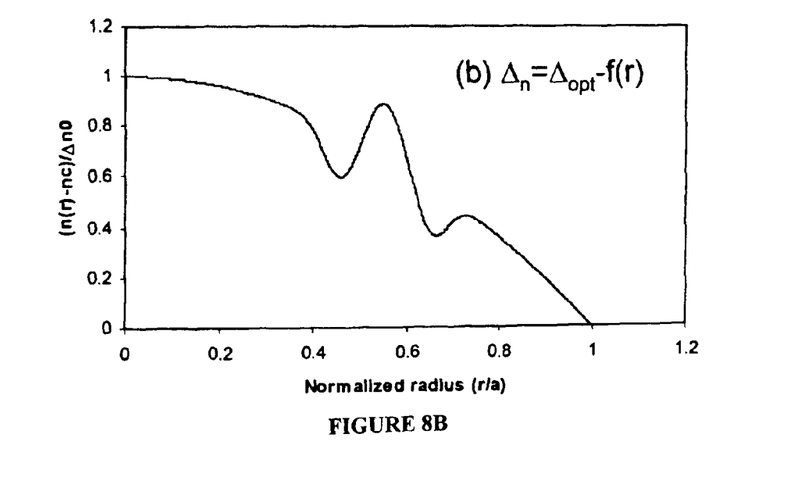

FIGS. 8A and 8B are refractive index profiles of multimode scrambling and unscrambling fibers 12 and 16 where the profile perturbation is a positive and negative triple peak Gaussian function respectively centered at 0.4, 0.5, 0.6 along the normalized radius axis. The triple peak Gaussian function may be expressed as:

$$f(r) = A\exp\left\{\frac{[(r-r_0)/a]^2}{t_0^2}\right\} - A_1\exp\left\{\frac{[(r-r_0-r_{01})/a]^2}{t_{01}^2}\right\} + A_2\left\{\frac{[(r-r_0-r_{02})/a]^2}{t_{02}^2}\right\} \quad (7)$$

By changing perturbation amplitudes A, $A_1$, and $A_2$ ($0.1 < A$, $A_1, A_2 \leq 1$), the perturbation positions $r_0$ ($0 < r_0 \leq a$), $r_{01}$ ($r_{01} \neq r_0$, $0<r_0 \leq a$), and $r_{02}$ ($r_{02} \neq r_{01} \neq r_0$, $0<r_0 \leq a$), and the perturbation pulsewidths $t_0$, $t_{01}$, $t_{02}$ (($0<t_0$, $t_{01}$, $t_{02} \leq 1$), scrambling and unscrambling fibers 12, 16 with different keys can be achieved. Table 3 gives maximum mode delay and number of achievable keys for ten fiber designs with a triple peak Gaussian function as follows:

TABLE 3

| Profile No. | r0 = | Max. mode delay per meter (ns/m) | Max. mode delay of 30 m (ns) | Number of keys (0.2 ns space) |
|---|---|---|---|---|
| 21 | 0.10 | 0.030266667 | 0.908 | 4.54 |
| 22 | 0.19 | 0.028533333 | 0.856 | 4.28 |
| 23 | 0.28 | 0.0282 | 0.846 | 4.23 |
| 24 | 0.37 | 0.027266667 | 0.818 | 4.09 |
| 25 | 0.46 | 0.026666667 | 0.8 | 4 |
| 26 | 0.54 | 0.026533333 | 0.796 | 3.98 |
| 27 | 0.63 | 0.0262 | 0.786 | 3.93 |
| 28 | 0.72 | 0.0262 | 0.786 | 3.93 |
| 29 | 0.81 | 0.0258 | 0.774 | 3.87 |
| 30 | 0.90 | 0.0254 | 0.762 | 3.81 |

The parameters $A=A_1=A_2$, $t_0=t_{01}=t_{02}$, and $r_{01}=r_{02}$ are respectively 0.2, 0.05, and 0.1 for all fiber designs. In Table 3 the number of keys is calculated by considering a mode delay space of 0.2 ns, and maximum fiber length for scrambling or unscrambling is 30 m.

Figure 9:
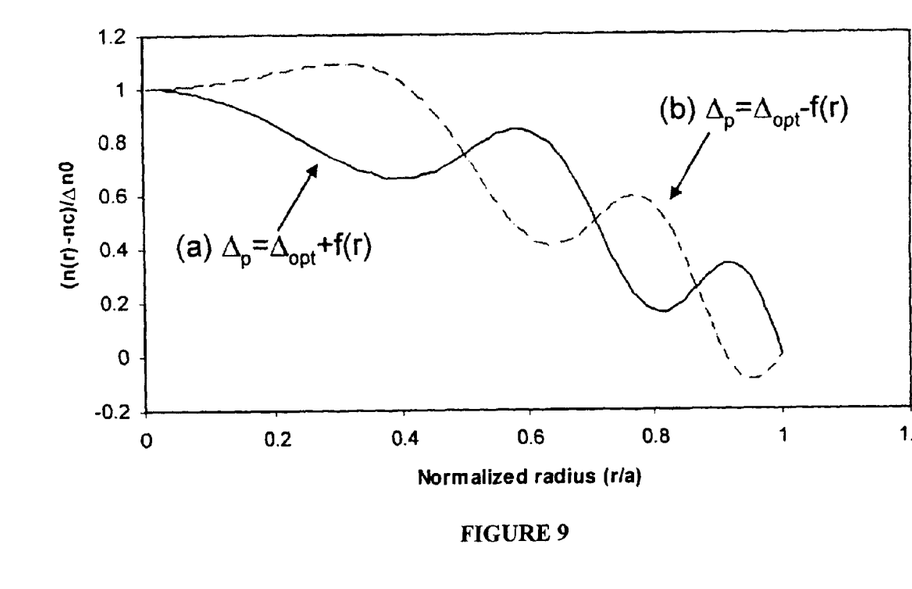
FIG. 9 illustrates the alpha profiles of optical fibers used in the scrambling and unscrambling units wherein the perturbations incorporated into the profiles follow complementary sinusoidal functions.

FIG. 9 is a refractive index profile of multimode scrambling (dashed line) and unscrambling (solid line) fibers 12 and 16 where the profile perturbation is a positive and negative sinusoidal function, respectively. The sinusoidal function may be expressed as:

$$f(r) = A \sin\left[m\pi\left(\frac{r}{a}\right)^2\right] \quad (7)$$

By changing the perturbation amplitude A ($0.1<A \leq 1$) and frequency parameter m, scrambling and unscrambling fibers 12, 16 with different keys can be achieved. Table 4 gives maximum mode delay and number of achievable keys for nine fiber designs with a sinusoidal function profile perturbation as follows:

TABLE 4

| Profile No. | m | Max. mode delay per meter (ns/m) | Max. mode delay of 30 m (ns) | Number of keys (0.2 ns space) |
|---|---|---|---|---|
| 31 | 1 | 0.008466667 | 0.254 | 2.54 |
| 32 | 2 | 0.010573333 | 0.3172 | 3.172 |
| 33 | 3 | 0.015706667 | 0.4712 | 4.712 |
| 34 | 4 | 0.013273333 | 0.3982 | 3.982 |
| 35 | 5 | 0.015698 | 0.47094 | 4.7094 |
| 36 | 6 | 0.022813333 | 0.6844 | 6.844 |
| 37 | 7 | 0.01634 | 0.4902 | 4.902 |
| 38 | 8 | 0.01656 | 0.4968 | 4.968 |
| 39 | 9 | 0.016753333 | 0.5026 | 5.026 |

The parameter A is 0.2 for all fiber designs In Table 4 the number of keys is calculated by considering a mode delay space of 0.2 ns, and maximum fiber length for scrambling or unscrambling is 30 m.

Figure 10:
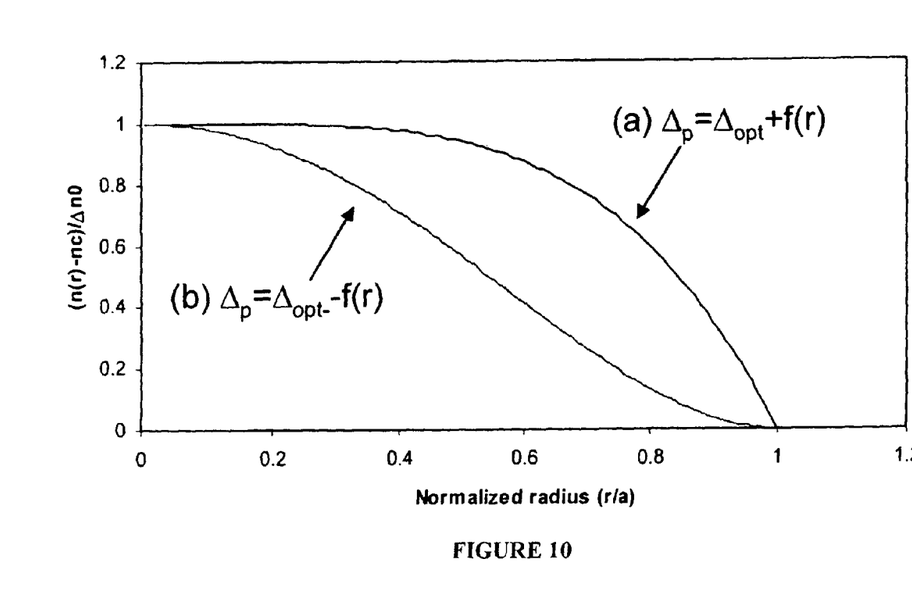
FIG. 10 illustrates the alpha profiles of optical fibers used in the scrambling and unscrambling units wherein the perturbations incorporated into the profiles follow complementary polynomial functions.

FIG. 10 is a refractive index profile of multimode scrambling (upper line) and unscrambling (lower line) fibers 12 and 16 where the profile perturbation is a positive and negative polynomial function. The polynomial function may be expressed as:

$$f(r) = A\left[\left(\frac{r}{a}\right)^{2n} - \left(\frac{r}{a}\right)^{4n}\right] \quad (7)$$

By changing perturbation amplitude A ($0.1<A \leq 1$) and parameter n, scrambling and unscrambling fibers 12, 16 with different keys can be achieved. Table 5 gives the maximum mode delay and number of achievable keys for six fiber designs with a polynomial function profile perturbation as follows:

TABLE 5

| Profile No. | n = | Max. mode delay per meter (ns/m) | Max. mode delay of 30 m (ns) | Number of keys (0.2 ns space) |
|---|---|---|---|---|
| 40 | 1.00 | 0.0222 | 0.666 | 3.33 |
| 41 | 2.00 | 0.020866667 | 0.626 | 3.13 |
| 42 | 3.00 | 0.020066667 | 0.602 | 3.01 |
| 43 | 4.00 | 0.019533333 | 0.586 | 2.93 |
| 44 | 5.00 | 0.019 | 0.57 | 2.85 |
| 45 | 6.00 | 0.018733333 | 0.562 | 2.81 |

The parameter A is 0.2 for all fiber designs in Table 5. The number of keys is calculated by considering a mode delay space of 0.2 ns, and maximum fiber length for scrambling or unscrambling is 30 m.

Figure 11A:
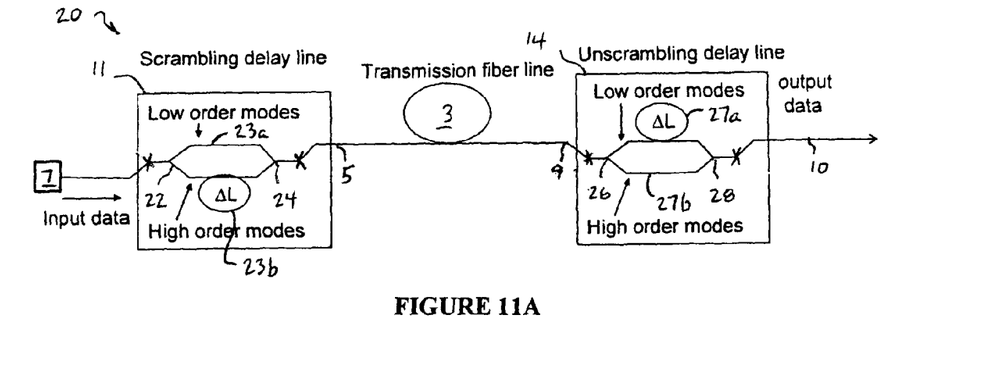
FIGS. 11A and 11B are schematic diagrams of two variations of a second embodiment of the system, wherein the differential delay of different groups of optical modes is accomplished by the combination of a mode splitter, and two different lengths of optical fiber that conduct the two groups of optical modes at different speeds.
Figure 11B:
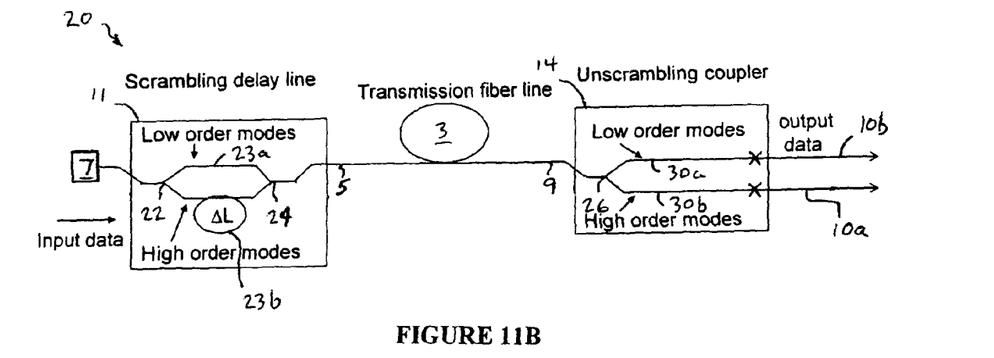

FIGS. 11A and 11B illustrate two variations of a second embodiment 20 of the system of the invention. With specific reference to FIG. 11A, the system 20, like the system 1, includes a multimode optical transmission fiber 3 having a receiving end 5 connected to an optical pulse signal source 7, and a transmitting end 9 connected to an output line 10. A scrambling unit 11 is connected between the optical pulse signal source 7 and the receiving end 5 of the multimode optical transmission fiber, and an unscrambling unit 14 is connected between the transmitting end of fiber 3 and output fiber 10. However, unlike the system 1, the scrambling unit 11 includes a mode splitter 22 for splitting the optical signal into two groups of higher and lower order optical modes, two different lengths 23a, 23b of optical fiber connected to the two outputs of the mode splitter, and a mode combiner 24 having two inputs which are likewise connected to the two different lengths 23a, 23b of optical fiber in the parallel configuration shown. The characteristics of the mode splitter 22 are such that there are enough modes in the two groups of modes so that interference effects are not important. Similar to the scrambling unit 11, the unscrambling unit 14 includes a mode splitter 26 that splits the optical pulses into the same two groups of higher and lower optical modes as the mode splitter 22 of the scrambling unit 11, two different lengths 27a, 27b of optical fiber connected to the outputs of the mode splitter 26, and a mode combiner 28 connected to the two different lengths 27a, 27b of optical fiber in the parallel configuration shown. In the scrambling unit 11, optical fiber 23b is longer than optical fiber 23a by a length ΔL, while in the unscrambling unit 14, optical fiber 27a is longer than optical fiber 27b by the same length ΔL. Additionally, all of the optical fibers 23a, 23b, 27a, 27b all have the same mode delaying characteristics.

In operation, optical pulses from source 7 are simultaneously conducted in parallel via lower order modes by fiber 23a, and by higher order modes via fiber 23b. The difference in length ΔL is selected to generate a differential delay between the two groups of modes that is at least one bit period long. For commercial transmission rates in the range of between about 10 Gbit and 200 MBit per second, this translates into a minimum delay range of between about 0.1 to 5.0 nanoseconds. When the scrambled signal reaches the unscrambling unit 14, the mode splitter 26 splits the modes in the scrambled signal back into the same higher and lower order modes as the splitter 22 of the scrambling unit 11, and the differential delay between the two groups of modes is counteracted by the ΔL between the optical fibers 27a and 27b. It should be noted that the second embodiment 20 has the advantage over the first-described embodiment 1 of not requiring custom-made optical fibers with positive and negative perturbations incorporated into the profile of the fibers.

In a variation of the second embodiment 20 shown in FIG. 11(b), the unscrambling unit 14 merely strips the one group (e.g. higher modes) modes at the receiving end, leaving only the other group (e.g. lower modes) modes which arrive well within the bit period and are conducted to the output line 10b. While the FIG. 11B embodiment is simpler to implement than the FIG. 11A embodiment, it has the disadvantage of higher losses as the reconstructed signal does not employ both of the groups of optical modes.

Key to the implementation of the second embodiments 20 shown in FIGS. 11A and 11B is the ability to cleanly select and then recombine selective modes. This can be achieved by using evanescent mode coupling such as a tapered multimode coupler. It is well known that the amount of power coupled in tapered multimode fibers is very mode dependent. The fundamental theory for such tapered couplers already established. Also, the applicants have experimentally demonstrated this mode selectivity by fabricating tapered multimode couplers using Corning's product code 1517 multimode fiber.

Figure 12:
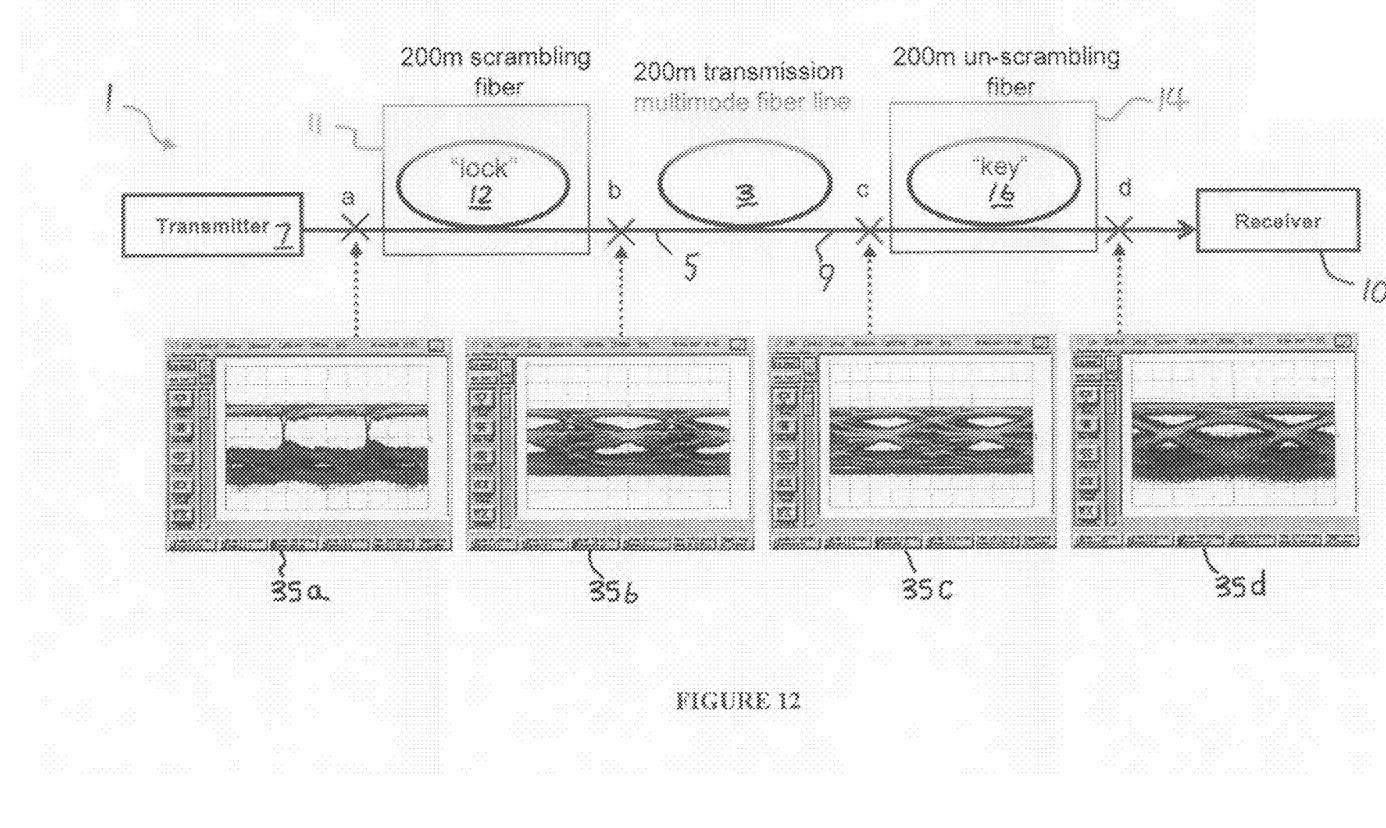
FIG. 12 illustrates an experimental setup for the concept demonstration of the first embodiment of the invention as well as the eye diagram measurement results at various positions in the embodiment.

FIG. 12 shows an experimental setup for the concept demonstration of the first embodiment. In the system 1, 200 meters of scrambling fiber 12 and 200 meters of unscrambling fiber 16 were used, and a multimode Fabry-Perot laser diode with a center wavelength at 1310 nm was used as the optical signal source 7. The laser diode was modulated by using pseudo-Random signal with a bit rate of 0.8 GB/s. The eye diagrams 35a, 35b, 35c and 35d were measured at the various positions a, b, c and d shown in FIG. 12. The closed eye diagram 35b measured at position b at the output of the scrambling fiber 12 indicates that the signal from source 7 has been scrambled by the differential delay of the optical modes imposed by the scrambling fiber 12. After the signal is transmitted through the 200 meter multimode transmission fiber 3 (with a bandwidth 472.9 MHz·km @ 1300 nm), the eye diagram 35c at position c is still closed, demonstrating that the signal is still scrambled. Finally, after the signal is transmitted through the unscrambling fiber 16, the open eye indicates that the unscrambled signal has been recovered because some of the mode dispersion in the signal is compensated by the unscrambling fiber. This experimental result demonstrates the system is operative. Because of the unbalance in the mode dispersion between the scrambling fiber 12 and unscrambling fiber 16, some signal distortion was observed. Such distortion can be minimized by optimizing the parameters of the scrambling and unscrambling fibers 12, 16.

Different modifications, additions, and variations of this invention may become evident to the persons in the art. All such variations, additions, and modifications are encompassed within the scope of this invention, which is limited only by the appended claims and the equivalents thereto.

What is claimed is:

1. A system for passively scrambling and unscrambling a pulsed optical signal transmitted through an optical multimode waveguide, comprising:
   a scrambling unit connected between a signal receiving end of said waveguide and an optical signal source that includes an optical fiber which creates a differential delay between two groups of optical modes of the signal that is at least one bit period of the bit period of the optical signal long such that said optical signal is scrambled, and
   an unscrambling unit connected to a signal transmitting end of said transmission fiber having an optical component that unscrambles the passively scrambled signal.

2. The system of claim 1, wherein said scrambling unit optical fiber has an optical property that creates said differential delay between two groups of optical modes of the signal, and the unscrambling unit has an optical fiber with an optical property that is complementary to the optical property of the scrambling unit optical fiber and that counteracts said differential delay between said two groups of optical modes of the signal such that said optical signal is unscrambled.

3. The system of claim 2, wherein the complementary optical properties of the scrambling unit and unscrambling unit optical fibers include complementary perturbations of the fiber alpha profile.

4. The system of claim 3, wherein said complementary perturbations are Gaussian function profile perturbations.

5. The system of claim 3, wherein said complementary perturbations are sinusoidal function profile perturbations.

6. The system of claim 3, wherein said complementary perturbations are polynomial function profile perturbations.

7. The system of claim 3, wherein said complementary perturbations are parabolic function profile perturbations.

8. The system of claim 3, wherein said complementary perturbations are hyperbolic function profile perturbations.

9. The system of claim 3, wherein said complementary perturbations are super-Gaussian function profile perturbations.

10. The system of claim 3, wherein said complementary perturbations are rectangular function profile perturbations.

11. The system of claim 3, wherein said complementary perturbations are triangular function profile perturbations.

12. The system of claim 3, wherein said complementary perturbations are any combination of Gaussian, super-Gaussian, sinusoidal, polynomial, parabolic, hyperbolic, rectangular and triangular function profile perturbations.

13. The system of claim 3, wherein said complementary perturbations are any single or multiple peak function profile perturbation.

14. The system of claim 3, including multiple, cascaded scrambler units for scrambling the signal, and multiple, cascaded unscrambling units for unscrambling the scrambled signal.

15. A system for passively scrambling and unscrambling a pulsed optical signal transmitted through an optical multimode waveguide, comprising:
   a scrambling unit connected between a signal receiving end of said waveguide and an optical signal source that includes at least one optical fiber which creates a differential delay between two groups of optical modes of the signal that is at least one bit period of the bit period of the optical signal long such that said optical signal is scrambled, and
   an unscrambling unit connected to a signal transmitting end of said transmission fiber having an optical component that unscrambles the passively scrambled signal, wherein said scrambling unit includes a mode splitter having an input connected to said signal source and first and second outputs for transmitting two groups of optical modes of said signal, and first and second lengths L1 and L2 of optical fiber connected to said first and second mode splitter outputs for generating said differential delay between said two groups of optical modes of the signal that is at least one bit period long such that said optical signal is scrambled, and a mode combiner having first and second inputs connected to said first and second lengths L1, L2 of optical fiber, respectively, and an output.

16. The system of claim 15, wherein said first and second lengths L1, L2 of optical fiber are different such that said differential delay between said two groups of optical modes of the signal is created.

17. The system of claim 15, wherein said unscrambling unit includes a mode splitter having an input connected to said transmitting end of said waveguide and first and second outputs for separating the same two groups of optical modes of said signal as said mode splitter of said scrambling unit.

18. The system of claim 17, wherein said unscrambling unit includes third and fourth lengths L3, L4 of optical fiber connected to said first and second outputs of said unscrambling unit mode splitter, L3 and L4 being of different lengths such that said differential delay between said two groups of optical modes of the signal is counteracted and the signal becomes unscrambled.

19. The system of claim 17, wherein one of said first and second outputs of said unscrambling unit mode splitter is connected to an output of said unscrambling unit.

20. A system for passively scrambling and unscrambling a pulsed optical signal transmitted through a multi-mode optical fiber, comprising:

a scrambling unit connected between a signal receiving end of said transmission fiber and an optical signal source that includes an optical fiber which creates a differential delay between two groups of optical modes of the signal that is at least one bit period of the bit period of the optical signal long such that said optical signal is passively scrambled, and an unscrambling unit connected to a signal transmitting end of said waveguide having an optical fiber that counteracts said differential delay between said two groups of optical modes of the signal such that said optical signal is unscrambled.

\* \* \* \* \*